United States Patent
Yoo et al.

(10) Patent No.: US 12,424,670 B2
(45) Date of Patent: Sep. 23, 2025

(54) POSITIVE ELECTRODE SLURRY COMPOSITION FOR SECONDARY BATTERY, AND POSITIVE ELECTRODE FOR SECONDARY BATTERY AND SECONDARY BATTERY WHICH ARE PREPARED BY USING THE SAME

(71) Applicant: LG Chem, Ltd., Seoul (KR)

(72) Inventors: Jung Woo Yoo, Daejeon (KR); Hye Lim Shim, Daejeon (KR); Jun Muk Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 607 days.

(21) Appl. No.: 16/809,075

(22) Filed: Mar. 4, 2020

(65) Prior Publication Data

US 2020/0203778 A1    Jun. 25, 2020

Related U.S. Application Data

(63) Continuation of application No. PCT/KR2018/014526, filed on Nov. 23, 2018.

(30) Foreign Application Priority Data

Nov. 24, 2017   (KR) .................. 10-2017-0158628
Nov. 24, 2017   (KR) .................. 10-2017-0158629

(51) Int. Cl.
*H01M 4/139*   (2010.01)
*H01M 4/62*    (2006.01)
(Continued)

(52) U.S. Cl.
CPC ....... *H01M 10/4235* (2013.01); *H01M 4/625* (2013.01); *H01M 2004/028* (2013.01)

(58) Field of Classification Search
None
See application file for complete search history.

(56) References Cited

U.S. PATENT DOCUMENTS

| | | |
|---|---|---|
| 2015/0050554 A1 | 2/2015 | Fukumine et al. |
| 2015/0132643 A1 | 5/2015 | Sasaki |

(Continued)

FOREIGN PATENT DOCUMENTS

| | | |
|---|---|---|
| CN | 104247109 A | 12/2014 |
| CN | 104396060 A | 3/2015 |

(Continued)

OTHER PUBLICATIONS

European Search Report for Application No. EP 18880311, dated Nov. 18, 2020, 11 pages.

(Continued)

*Primary Examiner* — Yoshitoshi Takeuchi
(74) *Attorney, Agent, or Firm* — Lerner David LLP

(57) ABSTRACT

A positive electrode slurry composition for a secondary battery which includes a positive electrode active material, a carbon-based conductive agent having a specific surface area (Brunauer-Emmett-Teller (BET)) of 100 m²/g to 200 m²/g, a binder, and a nitrile-based copolymer which has an electrolyte solution swelling degree defined by Equation (1) of 200% or less and does not contain a functional group other than a cyano group is provided:

electrolyte solution swelling degree (%)=$\{(W_1-W_0)/W_0\}\times 100$    Equation (1)

wherein, $W_0$ is an initial weight of a polymer film prepared from the nitrile-based copolymer, and $W_1$ is a weight of the polymer film which is measured after storing the polymer film at 60° for 48 hours in an electrolyte solution.

5 Claims, 2 Drawing Sheets

(51) Int. Cl.
    *H01M 10/42*     (2006.01)
    *H01M 4/02*     (2006.01)

(56) References Cited

U.S. PATENT DOCUMENTS

| | | | |
|---|---|---|---|
| 2017/0352915 A1 | 12/2017 | Katagiri et al. | |
| 2018/0090764 A1 | 3/2018 | Fukumine et al. | |
| 2018/0175370 A1 | 6/2018 | Kim et al. | |
| 2018/0198126 A1* | 7/2018 | Fukumine | C08K 3/04 |
| 2018/0198129 A1 | 7/2018 | Kim et al. | |
| 2018/0233734 A1 | 8/2018 | Ahn et al. | |

FOREIGN PATENT DOCUMENTS

| | | | |
|---|---|---|---|
| JP | 2011009116 A | 1/2011 | |
| JP | 2013206598 A | 10/2013 | |
| JP | 2017010821 A | 1/2017 | |
| KR | 20140106522 A | 9/2014 | |
| KR | 20150016852 A | 2/2015 | |
| KR | 20150092115 A | 8/2015 | |
| KR | 20170049459 A | 5/2017 | |
| KR | 20170069141 A | 6/2017 | |
| KR | 20170070863 A | 6/2017 | |
| KR | 20170111749 A | 10/2017 | |
| KR | 20170113212 A | 10/2017 | |
| KR | 20170117194 A | 10/2017 | |
| WO | 2012026583 A1 | 3/2012 | |
| WO | WO-2017010093 A1 * | 1/2017 | C08C 19/02 |
| WO | 2017074124 A1 | 5/2017 | |

OTHER PUBLICATIONS

Search report from International Application No. PCT/KR2018/014526, mailed Mar. 4, 2019.
Search Report dated Aug. 11, 2022 from the Office Action for Chinese Application No. 201880058782.0 issued Aug. 19, 2022, pp. 1-2.

* cited by examiner

_POSITIVE ELECTRODE SLURRY COMPOSITION FOR SECONDARY BATTERY, AND POSITIVE ELECTRODE FOR SECONDARY BATTERY AND SECONDARY BATTERY WHICH ARE PREPARED BY USING THE SAME_

CROSS-REFERENCE TO RELATED APPLICATIONS

This application is a continuation of International Application No. PCT/KR2018/014526, which claims priority from Korean Patent Application Nos. 10-2017-0158629 and 10-2017-0158628, filed on Nov. 24, 2017, the disclosures of which are incorporated herein by reference in their entirety.

TECHNICAL FIELD

The present invention relates to a positive electrode slurry composition for a secondary battery, a positive electrode, and a secondary battery, and more particularly, to a positive electrode slurry composition for a secondary battery having excellent high-temperature characteristics, and a positive electrode and a secondary battery which are prepared by using the same.

BACKGROUND ART

A positive electrode for a secondary battery is generally prepared by a method in which a positive electrode collector is coated with a positive electrode slurry composition including a positive electrode active material, a binder, and a conductive agent, dried, and then pressed.

The binder is used to bond the positive electrode active material on the positive electrode collector, wherein a fluorine-based binder, such as polyvinylidene fluoride, is widely used. The conductive agent is used to improve conductivity of the positive electrode, wherein carbon black and carbon nanotubes are widely used.

Also, a technique of mixing a nitrile-based copolymer with a binder resin and using the mixture has recently been proposed to improve energy density or cycle characteristics of a battery. Japanese Patent Application Laid-open Publication No. 2013-206598 (hereinafter, referred to as "Patent Document 1") discloses a technique of improving cycle characteristics and output characteristics by mixing a polymer containing a vinylidene fluoride unit with a nitrile-based copolymer containing a nitrile group, a hydrophilic group, and an alkylene group having 4 or more carbon atoms and using the mixture.

However, in a case in which the nitrile-based copolymer described in Patent Document 1 is used, affinity with an electrolyte solution is increased due to the presence of the hydrophilic functional group, and, as a result, since electrode adhesion is reduced while the nitrile-based copolymer is swollen by the electrolyte solution in a high-temperature environment during battery operation, high-temperature characteristics may be degraded. Also, the nitrile-based copolymer has been used as a binder in Patent Document 1, but, with respect to the nitrile-based copolymer, since adhesion is lower than polyvinylidene fluoride even if a functional group is used, electrode adhesion is reduced due to a decrease in amount of the polyvinylidene fluoride binder, and, as a result, the high-temperature characteristics are more degraded. In order to address this limitation, the amount of the binder must be increased, but, in a case in which the amount of the binder is increased, an amount of the positive electrode active material is reduced, and thus, electrochemical properties become insufficient.

DISCLOSURE OF THE INVENTION

Technical Problem

An aspect of the present invention provides a positive electrode slurry composition in which excellent electrochemical properties and electrode adhesion may be achieved even at high temperature by using a nitrile-based copolymer having a low electrolyte solution swelling coefficient.

Another aspect of the present invention provides a positive electrode slurry composition in which, when being mixed with the nitrile-based copolymer according to the present invention, dispersibility is excellent by using a conductive agent having a predetermined specific surface area.

Another aspect of the present invention provides a positive electrode having excellent electrode adhesion, high-temperature storability, and electrochemical properties which is prepared by using the above-described positive electrode slurry composition, and a secondary battery including the positive electrode.

Technical Solution

According to an aspect of the present invention, there is provided a positive electrode slurry composition for a secondary battery which includes a positive electrode active material, a carbon-based conductive agent having a specific surface area (Brunauer-Emmett-Teller (BET)) of 100 $m^2/g$ to 200 $m^2/g$, a binder, and a nitrile-based copolymer which has an electrolyte solution swelling degree defined by Equation (1) of 200% or less and does not contain a functional group other than a cyano group.

$$\text{electrolyte solution swelling degree (\%)} = \{(W_1 - W_0)/W_0\} \times 100 \qquad \text{Equation (1)}$$

In Equation (1), $W_0$ is an initial weight of a polymer film prepared from the nitrile-based copolymer, and $W_1$ is a weight of the polymer film which is measured after storing the polymer film at 60° for 48 hours in an electrolyte solution.

According to another aspect of the present invention, there is provided a positive electrode including a positive electrode active material layer formed by using the positive electrode slurry according to the present invention, and a secondary battery including the positive electrode, a negative electrode, a separator, and an electrolyte.

According to another aspect of the present invention, there is provided a secondary battery which includes: a positive electrode for a secondary battery which includes a positive electrode active material layer including a positive electrode active material, a carbon-based conductive agent having a specific surface area (BET) of 100 $m^2/g$ to 200 $m^2/g$, a binder, and a nitrile-based copolymer which has an electrolyte solution swelling degree defined by Equation (1) of 200% or less and does not contain a functional group other than a cyano group; a negative electrode; a separator; and an electrolyte.

$$\text{electrolyte solution swelling degree (\%)} = \{(W_1 - W_0)/W_0\} \times 100 \qquad \text{Equation (1)}$$

In Equation (1), $W_0$ is an initial weight of a polymer film prepared from the nitrile-based copolymer, and $W_1$ is a weight of the polymer film which is measured after storing the polymer film at 60° for 48 hours in an electrolyte solution.

Advantageous Effects

Since a nitrile-based copolymer having a low electrolyte solution swelling coefficient at high temperature is used in a positive electrode slurry composition of the present invention, a decrease in electrode adhesion, which occurs due to the swelling of the nitrile-based copolymer at high temperature, is minimized, and thus, excellent high-temperature storability may be achieved.

Also, since a carbon-based material conductive agent having a low specific surface area is used in the positive electrode slurry composition of the present invention, sufficient dispersibility may be achieved only by using a small amount of the nitrile-based copolymer, and, accordingly, deterioration of electrochemical properties due to a decrease in the amount of a positive electrode active material may be minimized.

A secondary battery, in which a positive electrode prepared by using the above-described positive electrode slurry composition of the present invention is used, has a resistance increase rate, which is measured after storage at 60° C. for 4 weeks, of 20% or less, wherein it has better high-temperature characteristics than a conventional secondary battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
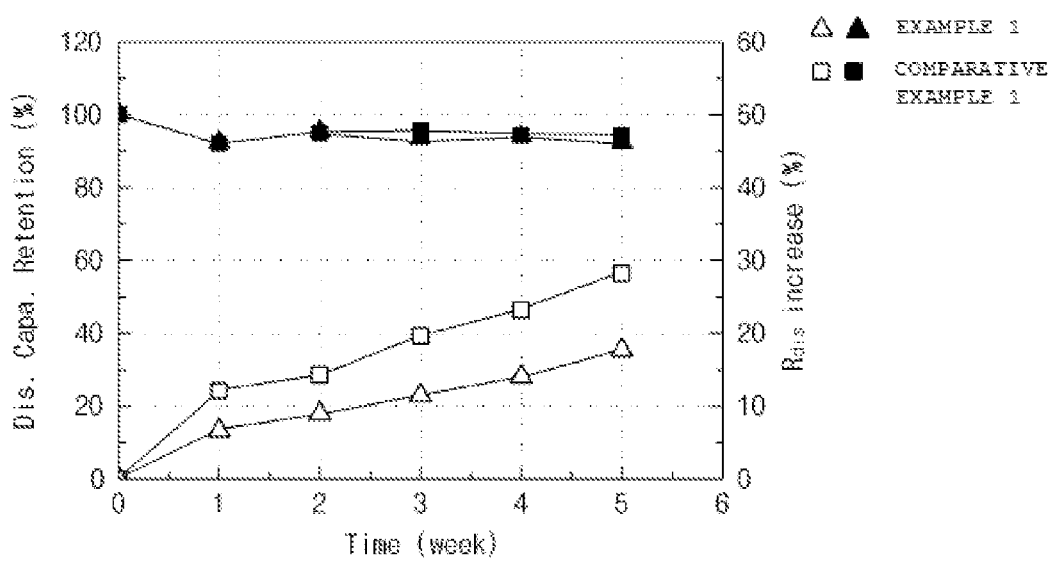
FIG. 1 is a graph showing capacity retention and an increase in resistance with time of secondary batteries of Example 1 and Comparative Example 1 according to Experimental Example 2.

Hereinafter, the present invention will be described in detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

In the present specification, the expression "average particle diameter $(D_{50})$" denotes a particle diameter at a cumulative volume of 50% in a particle size distribution curve, and the average particle diameter $(D_{50})$, for example, may be measured by a laser diffraction method.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

In the present specification, the expression "weight-average molecular weight" was measured under the following conditions using gel permeation chromatography (GPC), and measurement results were then converted by using standard polystyrene of an Agilent system.

<Measurement Conditions>

Measuring instrument: Agilent GPC (Agulent 1200 series, USA)

Column: two PL mixed B columns in series

Column temperature: 40° C.

Eluent: tetrahydrofuran

Flow rate: 1.0 mL/min

Concentration: ~1 mg/mL (100 µL injection)

Positive Electrode Slurry Composition

A positive electrode slurry composition according to the present invention includes (1) nitrile-based copolymer, (2) conductive agent, (3) positive electrode active material, and (4) binder. Hereinafter, each component of the positive electrode slurry composition of the present invention will be described.

(1) Nitrile-Based Copolymer

The nitrile-based copolymer is u s e d to improve dispersibilities of the components in a positive electrode slurry, wherein the nitrile-based copolymer is characterized in that it has a low electrolyte solution swelling coefficient at high temperature. Specifically, the nitrile-based copolymer may have an electrolyte solution swelling degree defined by the following Equation (1) of 200% or less, for example, 180% or less.

$$\text{electrolyte solution swelling degree (\%)} = \{(W_1-W_0)/W_0\} \times 100 \quad \text{Equation (1)}$$

In Equation (1), $W_0$ is an initial weight of a polymer film prepared from the nitrile-based copolymer, and $W_1$ is a weight of the polymer film which is measured after storing the polymer film at 60° for 48 hours in an electrolyte solution.

Specifically, after the nitrile-based copolymer is dissolved in N-methylpyrrolidone (NMP) and then prepared in the form of a film having a thickness of a few hundreds of µm, for example, 500 µm, the polymer film is prepared by drying the film. The electrolyte solution is prepared by dissolving 1.0 M $LiPF_6$ in an organic solvent in which ethylene carbonate and ethylmethyl carbonate are mixed in a volume ratio of 3:7.

In a case in which the electrolyte solution swelling degree of the nitrile-based copolymer satisfies the above range, electrochemical properties and electrode adhesion at high temperature are excellent.

Specifically, the nitrile-based copolymer may be a nitrile-based binary copolymer having an α,β-unsaturated nitrile-derived unit and a hydrogenated conjugated diene-derived unit.

The nitrile-based binary copolymer may be prepared by copolymerizing an α,β-unsaturated nitrile monomer and a conjugated diene-based monomer, and then hydrogenating a C=C double bond in the copolymer. The polymerization and hydrogenation of the monomers may be performed according to conventional methods.

As the α,β-unsaturated nitrile monomer, for example, acrylonitrile or methacrylonitrile may be used, and any one thereof or a mixture of two thereof may be used.

As the conjugated diene-based monomer, for example, conjugated diene-based monomers having 4 to 6 carbon atoms, such as 1,3-butadiene, isoprene, or 2-methyl-1,3-butadiene, may be used, and any one thereof or a mixture of two or more thereof may be used.

The nitrile-based binary copolymer may include 60 wt % to 80 wt %, for example, 65 wt % to 75 wt % of the hydrogenated conjugated diene-derived unit and 20 wt % to 40 wt %, for example, 25 wt % to 35 wt % of the α,β-unsaturated nitrile-derived unit. In a case in which amounts of the α,β-unsaturated nitrile-derived unit and the hydrogenated conjugated diene-derived unit satisfy the above ranges, dispersibility and high-temperature characteristics of the conductive agent and the binder are excellent. Herein, the amount of the α,β-unsaturated nitrile-derived unit may be measured as a median of values quantified by measuring an amount of nitrogen generated according to a mill oven method of JIS K 6364 and converting a binding amount thereof from a molecular weight of α,β-unsaturated nitrile, and the amount of the hydrogenated conjugated diene-derived unit may be calculated by subtracting a weight of the α,β-unsaturated nitrile-derived unit from a weight of the total copolymer.

The nitrile-based copolymer of the present invention does not include a unit derived from a monomer other than the α,β-unsaturated nitrile monomer and the conjugated diene-based monomer. In a case in which other monomers (e.g., alkyl(meth)acrylate monomer, monomer having a hydrophilic functional group such as a carboxyl group or a hydroxy group) are included in the nitrile-based copolymer, since affinity with the electrolyte solution is increased by a double bond or a functional group, swelling occurs due to the electrolyte solution at high temperature, and thus, electrode adhesion is reduced. It is desirable that the nitrile-based copolymer of the present invention does not include a functional group other than a cyano group.

Also, it is desirable that the nitrile-based copolymer of the present invention has a hydrogenation rate of the conjugated diene-based monomer of 90% or more, particularly 95% or more, and more particularly 99% or more. In a case in which unhydrogenated conjugated diene remains, reactivity with the electrolyte solution is increased due to the double bond in the conjugated diene to degrade high-temperature characteristics. Key technologies for hydrogenation of double bonds remaining in the nitrile-based copolymer are disclosed in literatures, for example, [Macromoleculed, 1987, 20, 2362, N. A. Mohammadi and G. L. Rempel] and [Rev. Macromol. Chem. Phys., 1995, C35(2), 239-285, N. T. McManus and G. L. Rempel]. Specifically, the hydrogenation is performed by catalytic hydrogenation using several different catalyst systems, such as rhodium (Rh), ruthenium (Ru), palladium (Pd), and iridium (Ir), and by using a uniform or non-uniform catalyst in acrylonitrile butadiene copolymer and polymer (NBR, SBR, polybutadiene), and the hydrogenation rate may be adjusted by controlling an amount of the catalyst, a reaction hydrogen pressure, and reaction time.

According to an embodiment, the nitrile-based copolymer may be composed of a repeating unit represented by the following [Formula 1] and a repeating unit represented by the following [Formula 2].

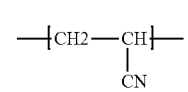
[Formula 1]

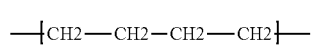
[Formula 2]

In this case, an amount of the repeating unit represented by [Formula 2] may be in a range of 60 wt % to 80 wt %, for example, 65 wt % to 75 wt %, and an amount of the repeating unit represented by [Formula 1] may be in a range of 20 wt % to 40 wt %, for example, 25 wt % to 35 wt %.

Also, the nitrile-based copolymer may have a weight-average molecular weight of 200,000 g/mol to 350,000 g/mol, particularly 200,000 g/mol to 300,000 g/mol, and more particularly 200,000 g/mol to 250,000 g/mol. When the weight-average molecular weight of the nitrile-based copolymer satisfies the above range, the conductive agent may be uniformly dispersed even if a small amount of the nitrile-based copolymer is used, and, since an excessive increase in viscosity of the solution may be prevented during the dispersion of the conductive agent, it is advantageous in the process.

The nitrile-based copolymer may be included in an amount of 0.02 part by weight to 5 parts by weight, particularly 0.02 part by weight to 2 parts by weight, and more particularly 0.02 part by weight to 1 part by weight based on 100 parts by weight of a total solid content in the positive electrode slurry composition.

(2) Conductive Agent

The conductive agent is used to improve conductivity of the positive electrode, wherein, for example, at least one carbon-based conductive agent, such as: graphite such as natural graphite or artificial graphite; carbon black such as acetylene black, Ketjen black, channel black, furnace black, lamp black, and thermal black; conductive fibers such as carbon fibers or metal fibers; conductive tubes such as carbon nanotubes; or fluorocarbon, may be used. Among them, carbon black, carbon nanotubes, or a combination thereof is particularly preferable.

In the carbon nanotubes, a graphite sheet has a cylindrical shape with a nano-sized diameter, and has an sp2 bond structure. In this case, the carbon nanotubes exhibit characteristics of a conductor or semiconductor depending on a structure and an angle at which the graphite sheet is rolled. Also, the carbon nanotubes may be classified into a single-walled carbon nanotube (SWCNT), a double-walled carbon nanotube (DWCNT), and a multi-walled carbon nanotube (MWCNT) depending on the number of bonds forming the wall, and these carbon nanotubes may be appropriately selected depending on the use of a dispersion.

Also, the carbon nanotubes may have a secondary shape formed by aggregating or arranging a plurality of carbon nanotubes, and, for example, the carbon nanotubes may include bundle-type carbon nanotubes in the form of a bundle or rope in which a plurality of carbon nanotubes are aligned or arranged side by side in a predetermined direction, or entangled-type carbon nanotubes in the form of a sphere or potato in which a plurality of carbon nanotubes are entangled without directivity.

The conductive agent may have a specific surface area (Brunauer-Emmett-Teller (BET)) of 100 m$^2$/g to 200 m$^2$/g, for example, 100 m$^2$/g to 190 m$^2$/g, 150 m$^2$/g to 200 m$^2$/g, or 100 m$^2$/g to 150 m$^2$/g. When the specific surface area of the conductive agent satisfies the above range, since the conductive agent may be mixed with the above-described nitrile-based copolymer of the present invention to exhibit excellent dispersibility and excellent conductivity may be achieved with only a small amount of the conductive agent, a decrease in capacity due to the reduction of an amount of a positive electrode active material may be effectively prevented. Specifically, in a case in which the specific surface area of the conductive agent is greater than 200 m$^2$/g, since dispersibility is reduced due to a large surface area of the conductive agent, a large amount of the nitrile-based copolymer must be used for smooth dispersion and, in a case in which a conductive agent dispersion dispersed by such a method is used, viscosity of the slurry is increased to reduce transferability and coatability. The viscosity of the slurry may be reduced by decreasing the amount of the slurry solid content, but, in this case, since the amount of the solvent in the slurry is high, there is a limitation in that the binder easily moves to a surface of the electrode during drying and non-uniformity of materials in the electrode occurs. In a case in which the specific surface area of the conductive agent is less than 100 m$^2$/g, it is difficult to achieve sufficient conductivity due to a poor electrical contact with the positive electrode active material, and, in a case in which the amount of the conductive agent is increased to achieve the conductivity, there is a limitation in that the amount of the active material is decreased to reduce battery capacity.

In a case in which carbon nanotubes are used as the conductive agent, the carbon nanotubes may have a specific surface area (BET) of 150 m$^2$/g to 200 m$^2$/g, for example, 150 m$^2$/g to 190 m$^2$/g.

When the specific surface area of the carbon nanotubes satisfies the above range, the slurry viscosity may be kept low even when the amount of the carbon nanotubes and the solid content concentration in the slurry are relatively high. Specifically, in a case in which the specific surface area of the carbon nanotubes is greater than 200 m$^2$/g, it is difficult to make a concentration of the carbon nanotubes in the conductive agent dispersion to be 2 wt % or more for the above reason, and suitable viscosity may be obtained when the solid content concentration of the slurry is less than 70 wt %. However, in a case in which the carbon nanotubes having the above-described specific surface area are used, the concentration of the carbon nanotubes in the conductive agent dispersion may be increased to 4 wt % to 5 wt %, and the solid content concentration of the slurry may be increased to 70 wt % or more.

Also, in a case in which carbon black is used as the conductive agent, the carbon black may have a specific surface area (BET) of 100 m$^2$/g to 150 m$^2$/g, for example, 110 m$^2$/g to 150 m$^2$/g. In a case in which the specific surface area of the carbon black is less than 100 m$^2$/g, it is difficult to achieve sufficient conductivity, and, in a case in which the specific surface area of the carbon black is greater than 150 m$^2$/g, the transferability and coatability may be reduced due to an increase in the viscosity.

The conductive may be included in an amount of 0.1 part by weight to 5 parts by weight, for example, 0.1 part by weight to 2 parts by weight based on 100 parts by weight of the total solid content in the positive electrode slurry composition.

(3) Positive Electrode Active Material

The positive electrode active material is a compound (lithiated intercalation compound) capable of reversibly intercalating and deintercalating lithium, wherein positive electrode active materials used in the art may be used without limitation.

For example, the positive electrode active material may include a lithium composite metal oxide including lithium and at least one metal such as cobalt, manganese, nickel, or aluminum. Specifically, the lithium composite metal oxide may include lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium-nickel-manganese-based oxide (e.g., LiNi$_{1-Y1}$Mn$_{Y1}$O$_2$ (where 0<Y1<1), LiMn$_{2-Z1}$Ni$_{z1}$O$_4$ (where 0<Z1<2), etc.), lithium-nickel-cobalt-based oxide (e.g., LiNi$_{1-Y2}$Co$_{Y2}$O$_2$ (where 0<Y2<1), lithium-manganese-cobalt-based oxide (e.g., LiCo$_{1-Y3}$Mn$_{Y3}$O$_2$ (where 0<Y3<1), LiMn$_{2-Z2}$Co$_{z2}$O$_4$(where 0<Z2<2), etc.), lithium-nickel-cobalt-manganese-based oxide (e.g., Li(Ni$_{P1}$Co$_{Q1}$Mn$_{R1}$)O$_2$ (where 0<P1<1, 0<Q1<1, 0<R1<1, and P1+Q1+R1=1) or Li(Ni$_{P2}$CO$_{Q2}$Mn$_{R2}$)O$_4$ (where 0<P2<2, 0<Q2<2, 0<R2<2, and P2+Q2+R2=2), etc.), or lithium-nickel-cobalt-manganese-transition metal (M) oxide (e.g., Li(Ni$_{P3}$Co$_{Q3}$Mn$_{R3}$M$^1$s)O$_2$ (where M$^1$ is selected from the group consisting of aluminum (Al), copper (Cu), iron (Fe), vanadium (V), chromium (Cr), titanium (Ti), zirconium (Zr), zinc (Zn), tantalum (Ta), niobium (Nb), magnesium (Mg), boron (B), tungsten (W), and molybdenum (Mo), and P3, Q3, R3, and S are atomic fractions of each independent elements, wherein 0<P3<1, 0<Q3<1, 0<R3<1, 0<S<1, and P3+Q3+R3+S=1), etc.), and any one thereof or a compound of two or more thereof may be included.

Also, in the lithium composite metal oxide, at least one of metallic elements excluding lithium may be doped or coated with at least one element selected from the group consisting of Al, Cu, Fe, V, Cr, Ti, Zr, Zn, Ta, Nb, Mg, B, W, and Mo. In a case in which the lithium defective lithium composite metal oxide is further doped or coated with the above-described metallic element as described above, structural stability of the positive electrode active material is improved, and, as a result, output characteristics of the battery may be improved.

Specifically, in the positive electrode active material according to an embodiment of the present invention, the lithium composite metal oxide may include a compound of Formula 3 below.

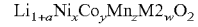

$$\text{Li}_{1+a}\text{Ni}_x\text{Co}_y\text{Mn}_z\text{M2}_w\text{O}_2 \quad \text{[Formula 3]}$$

(in Formula 3, M2 may include at least one element selected from the group consisting of Al, Cu, Fe, V, Cr, Ti, Zr, Zn, Ta, Nb, Mg, B, W, and Mo, and a, x, y, z, and w are each independently an atomic fraction of corresponding elements, wherein −0.5≤a≤0.5, 0≤x≤1, 0≤y≤1, 0≤z≤1, 0≤w≤1, and 0<x+y+z≤1)

The positive electrode active material may include a lithium composite metal oxide in which 0<x<1, 0<y<1, 0<z<1, and y+z≤x in Formula 3, in consideration of a significant improvement effect due to the mixed use of the above-described conductive agent and binder.

Among the above-described compounds, in terms of the improvement of capacity characteristics and stability of the battery, the lithium composite metal oxide may include LiCoO$_2$ or lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), and, in consideration of a significant improvement due to the control of type and content ratio of the elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be included.

The positive electrode active material may be included in an amount of 90 parts by weight to 99 parts by weight, for example, 96 parts by weight to 98.5 parts by weight based on 100 parts by weight of the total solid content in the positive electrode slurry composition.

(4) Binder

The binder is for the adhesion between positive electrode active material particles and the adhesion to a current collector, wherein binders used in the art may be used without limitation.

Specifically, the binder may include polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), a fluorine rubber, or copolymers thereof, and any one thereof or a mixture of two or more thereof may be used.

The binder may be included in an amount of 1 part by weight to 5 parts by weight, for example, 1.2 parts by weight to 2 parts by weight based on 100 parts by weight of the total solid content in the positive electrode slurry composition.

The positive electrode slurry of the present invention may further include a solvent for mixing and dispersing the above components. The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material and the binder in consideration of a coating thickness of the slurry and manufacturing yield, and may allow to have a viscosity that may provide excellent thickness uniformity during the subsequent coating for the preparation of the electrode.

Preferably, the positive electrode slurry of the present invention may include the solvent in an amount such that the solid content concentration is in a range of 70 wt % to 75 wt %, for example, 72 wt % to 74 wt %. Typically, it has been common that positive electrode slurries having a solid content of less than 70 wt % are used to maintain coating viscosity, but, since the positive electrode slurry of the present invention has viscosity characteristics lower than a conventional case by using the conductive agent having a predetermined specific surface area and the nitrile-based copolymer having specific physical properties, the positive electrode slurry of the present invention may be used in a higher solid content concentration than the conventional case. In a case in which a positive electrode is prepared by using the positive electrode slurry having a high solid content, the positive electrode having relatively high capacity characteristics may be prepared.

Method of Preparing Positive Electrode Slurry

The positive electrode slurry according to the present invention is prepared by mixing a positive electrode active material, a conductive agent, a nitrile-based copolymer, and a binder in a solvent. In this case, the positive electrode slurry may be prepared by mixing each of the components at the same time, and may be prepared by mixing some components first in consideration of dispersibility and then mixing remaining components.

For example, the positive electrode slurry according to the present invention may be prepared by a method in which the conductive agent and the nitrile-based copolymer are dispersed in a dispersion medium to prepare a conductive agent dispersion, and the conductive agent dispersion is then mixed with the positive electrode active material and the binder.

In this case, the dispersion medium may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 2-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used. Specifically, the dispersion medium may be an amide-based polar organic solvent in consideration of a dispersibility improvement effect on the conductive agent and the nitrile-based copolymer.

The mixing of the conductive agent, the nitrile-based copolymer, and the dispersion medium may be performed by a conventional mixing method, specifically, using a mixing device such as a homogenizer, a bead mill, a ball mill, a basket mill, an attrition mill, a universal stirrer, a clear mixer, a spike mill, or a TK mixer.

Also, during the mixing of the conductive agent and the dispersion medium, a cavitation dispersion treatment may be performed to increase mixability of the conductive agent and the dispersion medium or dispersibility of the conductive agent in the dispersion medium. The cavitation dispersion treatment is a dispersion treatment method using shock waves generated by the rupture of vacuum bubbles formed in water when high energy is applied to a liquid, wherein dispersion may be performed by the above method without damaging the characteristics of the conductive agent. Specifically, the cavitation dispersion treatment may be performed by ultrasonic waves, a jet mill, or a shear dispersion treatment.

Positive Electrode and Secondary Battery

Next, a positive electrode and a secondary battery according to the present invention will be described.

The positive electrode according to the present invention includes a positive electrode active material layer formed by using the positive electrode slurry composition according to the present invention. The positive electrode of the present invention may be prepared according to a typical method except that the positive electrode active material layer is formed by using the above positive electrode slurry composition. Specifically, the positive electrode may be prepared by coating the positive electrode slurry composition on a current collector and drying the coated current collector, or may be prepared by casting the positive electrode slurry composition on a separate support and then laminating a film separated from the support on the current collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer is formed by using the positive electrode slurry composition according to the present invention, wherein the positive electrode active material layer includes (1) nitrile-based copolymer, (2) conductive agent, (3) positive electrode active material, and (4) binder. Since detailed contents of each component of (1) to (4) are the same as those described above, a detailed description thereof will be omitted.

The secondary battery according to the present invention includes the positive electrode, a negative electrode, a separator, and an electrolyte.

In the lithium secondary battery, the negative electrode includes a negative electrode collector and a negative electrode active material layer disposed on at least one surface of the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer includes a negative electrode active material, and selectively further includes at least one of a binder and a conductive agent, if necessary.

The negative electrode active material layer, for example, may be prepared by coating a negative electrode slurry composition, which selectively includes the binder and the conductive agent as well as the negative electrode active material, on the negative electrode collector and drying the coated negative electrode collector, or may be prepared by casting the negative electrode slurry composition on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped or undoped with lithium such as $SiO_v(0<v<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The conductive agent is used to provide conductivity to the electrode, wherein any conductive agent may be used without particular limitation as long as it has electrical conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The binder, for example, may include polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), a fluorine rubber, or copolymers thereof, and any one thereof or a mixture of two or more thereof may be used.

The separator separates the negative electrode and the positive electrode and provides a movement path of lithium ions, wherein any separator may be used as the separator without particular limitation as long as it is typically used in a lithium secondary battery. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous organic solvent, wherein, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components.

The secondary battery according to the present invention as described above has excellent electrode adhesion at high temperature in comparison to a conventional secondary battery, and has a low resistance increase rate after high-temperature storage. Specifically, the secondary battery according to the present invention has a resistance increase rate measured after storage at 60° C. for 4 weeks of 20% or less.

Hereinafter, the present invention will be described in detail, according to specific examples.

Preparation Example 1

0.2 part by weight of a nitrile-based copolymer (weight-average molecular weight: 220,000 g/mol) including acrylonitrile unit and hydrogenated butadiene unit at a weight ratio of 34:66, 2 parts by weight of carbon black having a specific surface area of 135 $m^2/g$, 2 parts by weight of PVdF, and 95.8 parts by weight of a Li[$Ni_{0.6}Co_{0.2}Mn_{0.2}$]$O_2$ positive electrode active material were mixed, and a N-methylpyrrolidone (NMP) solvent was used to prepare positive electrode slurry composition A having a solid content of 72 wt %.

Preparation Example 2

0.08 part by weight of a nitrile-based copolymer (weight-average molecular weight: 220,000 g/mol) including acrylonitrile unit and hydrogenated butadiene unit at a weight ratio of 34:66, 0.4 part by weight of carbon nanotubes having a specific surface area of 185 $m^2/g$, 1.5 parts by weight of PVdF, and 98.02 parts by weight of a Li[$Ni_{0.6}Co_{0.2}Mn_{0.2}$]$O_2$ positive electrode active material were mixed, and a N-methylpyrrolidone (NMP) solvent was used to prepare positive electrode slurry composition B having a solid content of 72 wt %.

Preparation Example 3

0.08 part by weight of a nitrile-based copolymer (weight-average molecular weight: 310,000 g/mol) including acrylonitrile unit and hydrogenated butadiene unit at a weight ratio of 25:75, 0.4 part by weight of carbon nanotubes having a specific surface area of 185 $m^2/g$, 1.5 parts by weight of PVdF, and 98.02 parts by weight of a Li[$Ni_{0.6}Co_{0.2}Mn_{0.2}$]$O_2$ positive electrode active material were mixed, and a N-methylpyrrolidone (NMP) solvent was used to prepare positive electrode slurry composition C having a solid content of 72 wt %.

Comparative Preparation Example 1

0.2 part by weight of a nitrile-based copolymer (weight-average molecular weight: 400,000 g/mol) including acrylonitrile, hydrogenated butadiene, and acrylate at a weight ratio of 20:45:35, 2 parts by weight of carbon black having a specific surface area of 135 $m^2/g$, 2 parts by weight of PVdF, and 95.8 parts by weight of a Li[$Ni_{0.6}Co_{0.2}Mn_{0.2}$]$O_2$ positive electrode active material were mixed, and a N-methylpyrrolidone (NMP) solvent was used to prepare positive electrode slurry composition D having a solid content of 72 wt %.

Comparative Preparation Example 2

0.08 part by weight of a nitrile-based copolymer (weight-average molecular weight: 310,000 g/mol) including acrylonitrile unit and hydrogenated butadiene unit at a weight ratio of 40:60, 0.4 part by weight of carbon nanotubes having a specific surface area of 185 $m^2/g$, 1.5 parts by weight of PVdF, and 98.02 parts by weight of a Li[$Ni_{0.6}Co_{0.2}Mn_{0.2}$]$O_2$ positive electrode active material were mixed, and a N-methylpyrrolidone (NMP) solvent was used to prepare positive electrode slurry composition E having a solid content of 72 wt %.

Comparative Preparation Example 3

0.08 part by weight of a nitrile-based copolymer (weight-average molecular weight: 290,000 g/mol) including acrylonitrile unit, hydrogenated butadiene unit, and butadiene unit at a weight ratio of 34:49:17, 0.4 part by weight of carbon nanotubes having a specific surface area of 189 m$^2$/g, 1.5 parts by weight of PVdF, and 98.02 parts by weight of a Li[Ni$_{0.6}$Co$_{0.2}$Mn$_{0.2}$]O$_2$ positive electrode active material were mixed, and a N-methylpyrrolidone (NMP) solvent was used to prepare positive electrode slurry composition F having a solid content of 72 wt %.

Comparative Preparation Example 4

Positive electrode slurry composition G was prepared in the same manner as in Preparation Example 3 except that carbon nanotubes having a specific surface area of 249 m$^2$/g was used instead of the carbon nanotubes having a specific surface area of 185 m$^2$/g, and the solid content of the slurry was adjusted to 68% in order to maintain the same slurry viscosity as that of Preparation Example 3.

Comparative Preparation Example 5

Positive electrode slurry composition H was prepared in the same manner as in Preparation Example 3 except that carbon black having a specific surface area of 58 m$^2$/g was used instead of the carbon nanotubes having a specific surface area of 185 m$^2$/g, and the solid content of the slurry was adjusted to 74% in order to maintain the same slurry viscosity as that of Preparation Example 3.

Comparative Preparation Example 6

Positive electrode slurry composition I was prepared in the same manner as in Preparation Example 1 except that a nitrile-based copolymer, including acrylonitrile unit, 2-ethylhexyl acrylate unit, methacrylic acid unit, and 2-acrylamide-2-methylpropanesulfonic acid unit at a weight ratio of 15:67.5:17:0.5, was used instead of the nitrile-based copolymer of Preparation Example 1.

Examples 1 to 3 and Comparative Examples 1 to 6

An aluminum current collector was coated with each of the positive electrode slurries A to I prepared by Preparation Examples 1 to 3 and Comparative Preparation Examples 1 to 6, roll-pressed, and then dried at 120° C. for 8 hours to prepare each positive electrode.

Also, artificial graphite as a negative electrode active material, carbon black as a conductive agent, carboxymethyl cellulose as a thickening agent, and a styrene-butadiene rubber (SBR), as a binder, were mixed in a weight ratio of 95.6:1:1.2:2.2 to prepare a negative electrode slurry composition. A copper foil was coated with the prepared negative electrode slurry composition and vacuum-dried at 110° C. for 8 hours to prepare a negative electrode.

A polyethylene separator (Tonen Chemical Corporation, F20BHE, thickness=20 μm) was disposed between the above-prepared positive electrode and negative electrode, and an electrolyte (IM lithium hexafluorophosphate (LiPF$_6$), ethylene carbonate/dimethyl carbonate=volume ratio of 1:1) was then injected to prepare a secondary battery.

Experimental Example 1—Electrolyte Solution Swelling Coefficient Measurement

Polymer solutions were formed by dissolving each of the nitrile-based copolymers used in Preparation Examples 1 and 3 and Comparative Preparation Examples 1 to 3 and 6 in a NMP solvent, and each of the polymer solutions was cast and then dried to obtain a polymer film having at thickness of 500 μm.

After the obtained polymer film was immersed in an electrolyte solution, which was prepared by dissolving 1.0 M LiPF$_6$ in an organic solvent in which ethylene carbonate and ethylmethyl carbonate were mixed in a volume ratio of 3:7, and then stored at 60° C. for 48 hours, an electrolyte swelling coefficient according to Equation (1) was measured. The measured electrolyte swelling degrees are presented in [Table 1] below.

TABLE 1

|  | Electrolyte solution swelling degree (%) |
| --- | --- |
| Example 1 | 152% |
| Example 3 | 141% |
| Comparative Example 1 | 219% |
| Comparative Example 2 | 356% |
| Comparative Example 3 | 408% |
| Comparative Example 6 | 704% |

Experimental Example 2—High-Temperature Storage Characteristics Evaluation

Initial resistances of the secondary batteries prepared by Examples 1 to 3 and Comparative Examples 1 to 6 were measured, and resistance increase rates were then measured by measuring resistances after each of the secondary batteries was stored at 60° C. for 4 weeks. The measurement results are presented in [Table 2] and FIGS. 1 and 2 below.

Figure 2:
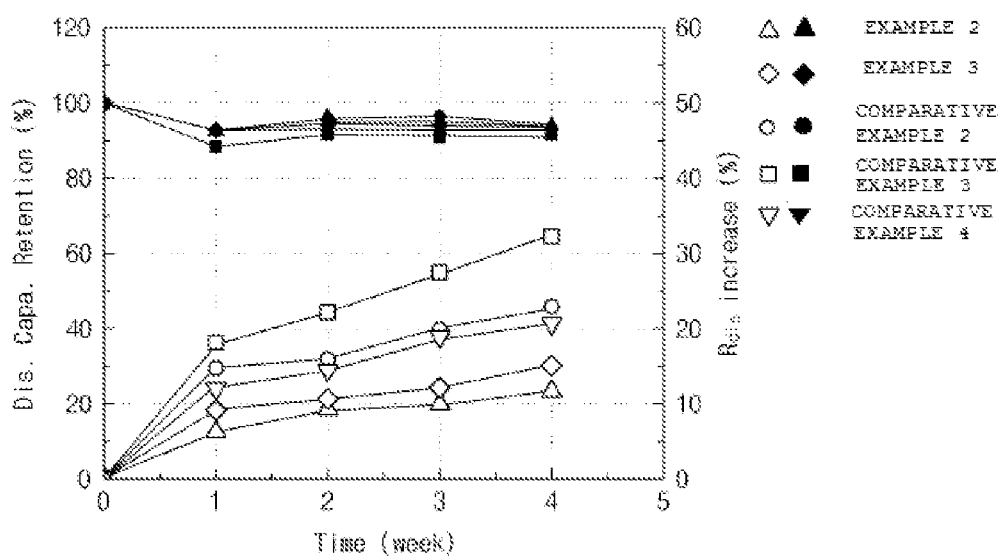
FIG. 2 is a graph showing capacity retention and an increase in resistance with time of secondary batteries of Examples 2 and 3 and Comparative Examples 2 to 4 according to Experimental Example 2.

FIG. 1 is a graph showing capacity retention and an increase in resistance with time of the secondary batteries of Example 1 and Comparative Example 1, and FIG. 2 is a graph showing capacity retention and an increase in resistance with time of the secondary batteries of Examples 2 and 3 and Comparative Examples 2 to 4.

TABLE 2

|  | Resistance increase rate after 4 weeks storage (%) |
| --- | --- |
| Example 1 | 14.0% |
| Example 2 | 11.8% |
| Example 3 | 15.2% |
| Comparative Example 1 | 22.9% |
| Comparative Example 2 | 22.9% |
| Comparative Example 3 | 32.3% |
| Comparative Example 4 | 20.8% |
| Comparative Example 5 | 35.2% |
| Comparative Example 6 | 40.2% |

As illustrated in [Table 2] and FIGS. 1 and 2, with respect to the secondary batteries of Examples 1 to 3 in which the nitrile-based copolymers having an electrolyte solution swelling degree of 200% or less according to the present invention and the carbon-based conductive agents having a specific surface area of 100 m$^2$/g to 200 m$^2$/g were used, since the resistance increase rates were low and the capacity retentions were high after high-temperature storage, the secondary batteries of Examples 1 to 3 exhibited excellent high-temperature characteristics. In contrast, with respect to the secondary batteries of Comparative Examples 1 to 3 and 6 in which the nitrile-based copolymers having an electrolyte solution swelling degree of greater than 200% were used, since the resistance increase rates were high and the capacity retentions were low after high-temperature storage, it may be confirmed that high-temperature characteristics were degraded.

Also, in a case in which the specific surface area of the conductive agent was greater than 200 m²/g even if the welling degree of the nitrile-based copolymer was 200% or less (Comparative Example 4), since the viscosity of the slurry was high, the solid content in the slurry must be reduced, and, as a result, the distribution of the binder became non-uniform so that high-temperature characteristics were degraded.

Furthermore, in a case in which the specific surface area of the conductive agent was less than 100 m²/g even if the welling degree of the nitrile-based copolymer was 200% or less (Comparative Example 5), or in a case in which the nitrile-based copolymer containing a functional group other than a nitrile group was used (Comparative Examples 1 and 6), high-temperature characteristics were also degraded.

The invention claimed is:

1. A secondary battery comprising a positive electrode, a negative electrode, a separator, and an electrolyte,
    wherein the positive electrode comprises a positive electrode active material layer formed by using a positive electrode slurry composition, wherein the positive electrode slurry composition, comprises:
    a positive electrode active material,
    carbon nanotubes having a specific surface area measured by a Brunauer-Emmett-Teller (BET) of 150 m²/g to 190 m²/g,
    a binder, and
    a nitrile-based copolymer which has an electrolyte solution swelling degree defined by Equation (1) of 200% or less and does not contain a functional group other than a cyano group:

electrolyte solution swelling degree (%)={($W_1-W_0$)/$W_0$}×100  Equation (1):

wherein, in Equation (1), $W_0$ is an initial weight of a polymer film prepared from the nitrile-based copolymer, and $W_1$ is a weight of the polymer film which is measured after storing the polymer film at 60° for 48 hours in an electrolyte solution,
    wherein the positive electrode slurry composition has a solid content concentration of 70 wt % to 75 wt %,
    wherein the nitrile-based copolymer has a weight-average molecular weight of 200,000 g/mol to 350,000 g/mol, and comprises 65 wt % to 75 wt % of a hydrogenated conjugated diene-derived unit and 25 wt % to 35 wt % of an α,β-unsaturated nitrile-derived unit,
    wherein the nitrile-based copolymer is composed of a repeating unit represented by [Formula 1] and a repeating unit represented by [Formula 2],

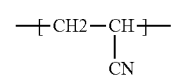
    [Formula 1]

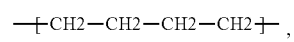
    [Formula 2]

and
    wherein a resistance increase rate measured after storage of the secondary battery at 60° C. for 4 weeks is 20% or less.

2. The secondary battery of claim 1, wherein the nitrile-based copolymer is a nitrile-based binary copolymer having the α,β-unsaturated nitrile-derived unit and the hydrogenated conjugated diene-derived unit.

3. The secondary battery of claim 2, wherein the nitrile-based binary copolymer has a hydrogenation rate of the conjugated diene-derived unit of 90% or more.

4. The secondary battery of claim 1, comprising:
    96 parts by weight to 98.5 parts by weight of the positive electrode active material,
    0.1 part by weight to 2 parts by weight of the carbon nanotubes,
    1.2 parts by weight to 2 parts by weight of the binder, and
    0.02 part by weight to 2 parts by weight of the nitrile-based copolymer based on 100 parts by weight of a total solid content in the positive electrode slurry composition.

5. The secondary battery of claim 1, wherein the nitrile-based copolymer has the electrolyte solution swelling degree of 141% to 200%.

* * * * *